US006839812B2

(12) United States Patent
Royer, Jr. et al.

(10) Patent No.: US 6,839,812 B2
(45) Date of Patent: Jan. 4, 2005

(54) METHOD AND SYSTEM TO CACHE METADATA

(75) Inventors: Robert J. Royer, Jr., Portland, OR (US); Jeanna N. Matthews, Messana, NY (US)

(73) Assignee: Intel Corporation, Santa Clara, CA (US)

( * ) Notice: Subject to any disclaimer, the term of this patent is extended or adjusted under 35 U.S.C. 154(b) by 86 days.

(21) Appl. No.: 10/026,398

(22) Filed: Dec. 21, 2001

(65) Prior Publication Data

US 2003/0120868 A1 Jun. 26, 2003

(51) Int. Cl.[7] ............................................. G06F 12/08
(52) U.S. Cl. ....................................................... 711/144
(58) Field of Search ................................ 711/118, 119, 711/144, 145

(56) References Cited

U.S. PATENT DOCUMENTS

| 5,136,691 A | * | 8/1992 | Baror ........................ 711/139 |
| 5,761,678 A | | 6/1998 | Bendert et al. |
| 5,913,224 A | | 6/1999 | MacDonald |
| 5,974,508 A | | 10/1999 | Maheshwari |
| 6,081,883 A | * | 6/2000 | Popelka et al. ............... 712/28 |
| 6,119,118 A | | 9/2000 | Kain, III et al. |
| 6,240,416 B1 | | 5/2001 | Immon et al. |
| 6,295,538 B1 | | 9/2001 | Cooper et al. |
| 6,298,130 B1 | | 10/2001 | Galvin |
| 6,308,168 B1 | | 10/2001 | Dovich et al. |
| 6,385,697 B1 | * | 5/2002 | Miyazaki ..................... 711/128 |
| 6,438,653 B1 | * | 8/2002 | Akashi et al. ............... 711/128 |

FOREIGN PATENT DOCUMENTS

| EP | 0210384 B1 | 2/1987 |
| GB | 221048 A | 6/1989 |

OTHER PUBLICATIONS

U.S. Appl. No. 09/945,266, pending, Richard Coulson, filed Aug. 31, 01.
U.S. Appl. No. 09/895,578, pending, Royer, et al., filed Jun. 29, 2001.
U.S. Appl. No., 09/894,310, pending, Coulson, et al., filed Jun. 27, 2001.

* cited by examiner

Primary Examiner—Kevin L. Ellis
(74) Attorney, Agent, or Firm—Anthony M. Martinez

(57) ABSTRACT

Briefly, in accordance with an embodiment of the invention, a method and system to store cache metadata from a higher latency media in a lower latency media is provided.

33 Claims, 3 Drawing Sheets

METHOD AND SYSTEM TO CACHE METADATA

BACKGROUND

In a computing system, access time is the time a program or device takes to locate a single piece of information and make it available to the computer for processing. The use of a cache in a computer may reduce memory access time, thereby increasing the overall speed of the system. Generally, a cache memory is a small and fast type of memory device that improves system performance by storing, for example, frequently accessed data.

Since a computer system may make multiple accesses to the cache, the type of caching device used in a system may affect system performance. For example, the use of a cache memory having a relatively slow access time may reduce system performance. In addition, the caching algorithms used to determine which data to cache may also affect system performance.

Thus, there is a continuing need for better ways to perform caching in computing systems.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
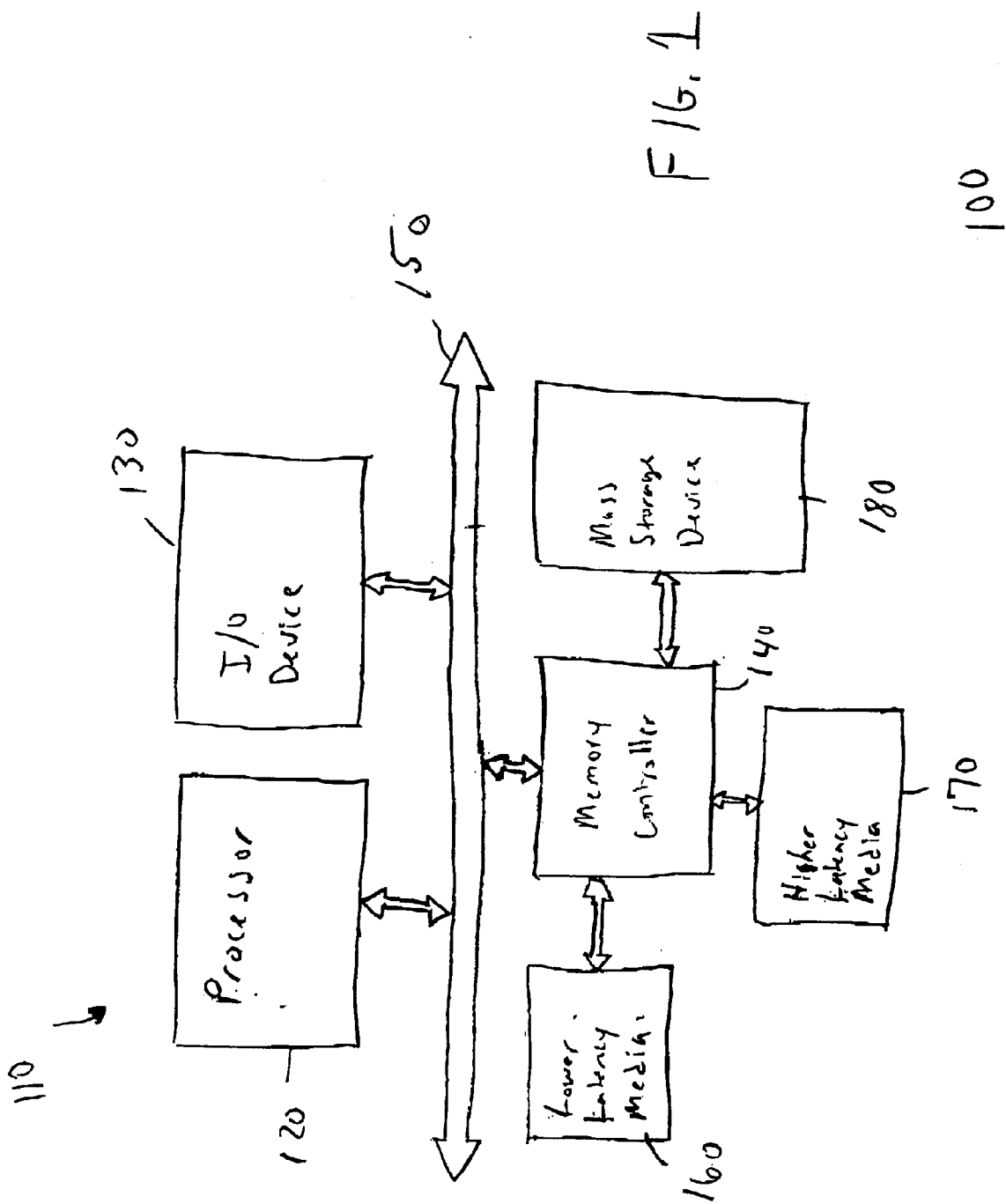
FIG. 1 is a block diagram of a computing system in accordance with an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

In the following description and claims, the term "media" may include a storage medium on which data and/or instructions can be stored. Examples of media include, but are not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions and/or data. When used in a system, these media have various access times. A device having a relatively fast access time may be characterized or referred to as a lower latency media and a device having a relatively slower access time compared to the lower latency media, may be characterized as a higher latency media.

Turning to FIG. 1, an embodiment 100 in accordance with the present invention is described. Embodiment 100 may comprise a computing system 110. Computing system 110 may be used in a variety of applications such as, for example, a portable computer, a desktop computer, a server, or the like. Although it should be pointed out that the scope and application of the present invention is in no way limited to these examples.

In this embodiment, computing system 110 may comprise a processor 120, an input/output (I/O) device 130, and a memory controller 140 connected to a bus 150. In addition, computing system 110 may include a lower latency media 160, a higher latency media 170, and a mass storage device 180 connected to memory controller 140.

Although the scope of the present invention is not limited in this respect, processor 120 may comprise, for example, a microprocessor, a digital signal processor, a microcontroller, or the like. I/O device 130 may be used for receiving data from a user or may be used for transmitting data to a user. I/O device 130 may comprise, for example, a keyboard, a display, a computer mouse, or a printer, although the scope of the present invention is not limited in this respect. Bus 150 may be a data path comprising, for example, a collection of data lines to transmit data from one part of computing system 110 to another.

In this embodiment, memory controller 140 together with processor 120 controls lower latency media 160, higher latency media 170, and mass storage device 180. For example, memory controller 140 controls the transfer of data between lower latency media 160, higher latency media 170, and mass storage device 180. Memory controller 140 may be integrated ("on-chip") with processor 120. In an alternate embodiment, memory controller 140 may be a discrete memory controller, wherein memory controller 140 is external ("off-chip") to processor 120. In another embodiment, portions of the functionality of memory controller 140 may be implemented in processor 120 as, for example, a software application, module, or routine.

In accordance with an embodiment of the present invention, lower latency media 160 may be a main memory or a cache memory device and may have an access time of less than 1 microsecond, e.g., 150 nanoseconds, and higher latency media 170 may be a cache memory such as, for example, a disk cache, and may have a relatively slower access time, compared to lower latency media 170, of at least 1 microsecond, e.g., approximately 1 microsecond, although the scope of the present invention is not limited in this respect. As another example, in alternate embodiments, lower latency media 160 may have an access time of less than 50 nanoseconds, e.g., approximately 10 nanoseconds, and higher latency media 170 may have a slower access time, compared to lower latency media 160, of at least 50 nanoseconds, e.g., approximately 100 nanoseconds. In this example, the access time of 10 nanoseconds is less than the access time of 50 nanoseconds. In addition, although the scope of the present invention is not limited in this respect, some embodiments may include lower latency media 160 and higher latency media 170, wherein the access time of lower latency media 160 is at least two times faster than the access time of higher latency media 170. For example, in some embodiments, lower latency media 160 may have an access time of about 50 nanoseconds and higher latency media 170 may have an access time of about 100 nanoseconds.

Lower latency media 160 may be a volatile memory such as, for example, a static random access memory (SRAM) or a dynamic random access memory (DRAM), although the scope of the present invention is not limited in this respect. In alternate embodiments, lower latency media 160 may be a nonvolatile memory. Higher latency media 170 may be a nonvolatile memory such as, for example, an electrically programmable read-only memory (EPROM), an electrically erasable and programmable read only memory (EEPROM), a flash memory (NAND and NOR types, including multiple bits per cell), a ferroelectric random access memory (FRAM), a polymer ferroelectric random access memory (PFRAM), a magnetic random access memory (MRAM), an Ovonics Unified Memory (OUM), or a disk memory, although the scope of the present invention is not limited in this respect. In alternate embodiments, higher latency media 170 may be part of a mass storage device such as, for example, a disk memory. For example, a reserved portion of a hard disk (not shown) may be used to implement higher latency media 170.

Mass storage device 180 may be a disk memory such as, for example, a floppy disk, a hard disk, an optical disk, or a magnetic disk. In alternate embodiments, mass storage device 180 may be an EPROM, an EEPROM, a magnetic or optical card, a flash memory, a FRAM, a PFRAM, a MRAM, an OUM, or any other device capable of storing large amounts of information (e.g., megabytes of data).

In the embodiment illustrated in FIG. 1, higher latency media 170 may operate as a cache for mass storage device 180, wherein higher latency media 170 may be a relatively smaller and faster type of memory device compared to mass storage device 180. As an example, higher latency media 170 may cache frequently accessed data from the mass storage device 160 during operation of computing system 110. As frequently accessed data is requested from mass storage device 180, it may be available in the higher latency media 170, thereby avoiding a relatively longer search and fetch in mass storage device 180.

In addition to caching data from mass storage device 180, higher latency media 170 may also be adapted to store metadata that corresponds to the cache data. Metadata refers generally to cache state information describing the cache data or information for managing the cache data. As an example, if higher latency media 170 is considered full based, at least in part, on the metadata, then a corresponding cache line in higher latency media 170 may be deallocated. In another example, the metadata may include information used to determine if the cache data is invalid. If the cache data is invalid, it may need to be replaced or deallocated depending on the caching algorithms used for managing the cache data. In yet another example, the metadata may include usage information such as, for example, a hit count to determined how frequently the corresponding cache data is accessed. Since the metadata in this embodiment corresponds to the cache data, this type of metadata may be referred to as cache metadata or cache state information.

Figure 2:
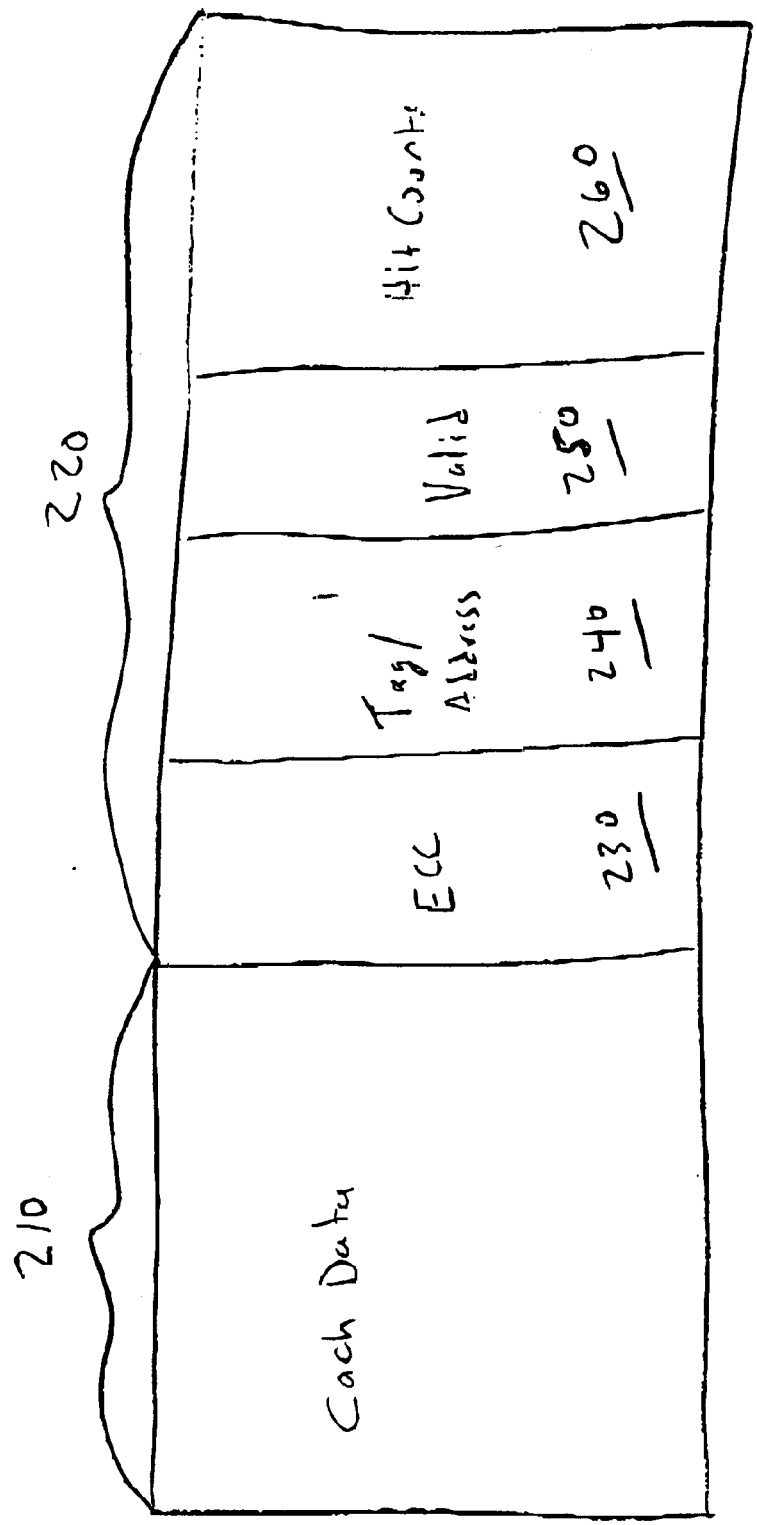
FIG. 2 illustrates a cache line layout in accordance with an embodiment of the present invention.

Referring to FIG. 2, an example of a cache line layout is illustrated in accordance with an embodiment of the present invention. Although the scope of the present invention is not limited in this respect, in this embodiment, a cache line 200 may include cache data 210 and corresponding metadata 220. By way of example, cache data 210 may be 512 bytes of recently accessed data from mass storage device 180 (FIG. 1). Metadata 220 may include an error correction code (ECC) 230 to recover cache data 210, a tag or address 240 to indicate the data in mass storage device 180 to which cache data 210 corresponds, and a bit 250 to indicate if cache data 210 is valid. Metadata 220 also may include a hit count 260 that is updated when cache line 200 is read or written. If hit count 260 is less than a predetermined count, then cache line 200 may be deallocated or replaced in higher latency media 170.

Lower latency media 160 may operate as a cache for higher latency media 170 by caching metadata 200 and cache data 210. In this embodiment, lower latency media 160 may be a relatively smaller and faster type of memory device compared to higher latency media 170.

Figure 3:
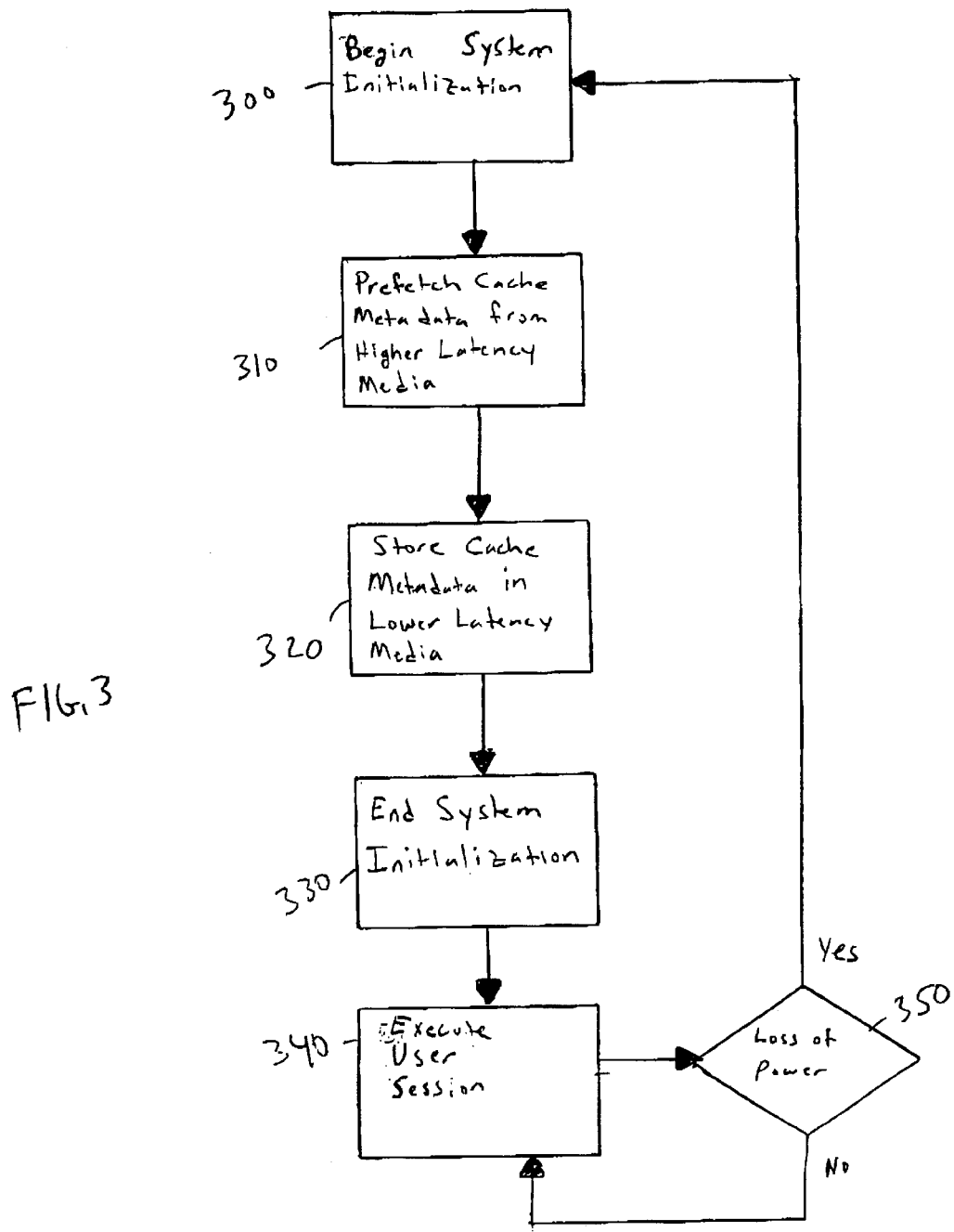
FIG. 3 is a flow chart of a method to cache metadata in accordance with an embodiment of the present invention.

Referring to FIG. 3, a method to cache metadata in accordance with an embodiment of the present invention is provided. This method may be illustrated using computing system 110 of FIG. 1 and cache line 200 of FIG. 2. This embodiment may begin with a system boot or system initialization, block 300. The term "system boot" may refer to initialization of a computing system both when the power is first turned on, known as cold booting, and/or when a computer is restarted, known as warm booting. During system initialization, the components of computing system 110 may be initialized.

During the system initialization, cache metadata 220 may be prefetched from higher latency media 170 to lower latency media 160, block 310. This prefetching process may proactively attempt to determine what metadata may be desired and prefetch it, to provide better performance. In this embodiment, all the cache metadata stored in higher latency media 170 is fetched and transmitted to lower latency media 160. In an alternate embodiment, the cache metadata may be demand fetched during a user session. The demand fetching operation may include fetching specifically identified metadata when it is requested.

In this embodiment, after prefetching, cache metadata 220 may be stored in lower latency media 160 (block 320) and then the system initialization is completed (block 330) followed by execution of a user session (block 340). It should be noted that the sequence of the actions described in FIG. 3 is not a limitation of the present invention. For example, in alternate embodiments, cache metadata 220 may be stored in lower latency media 160 after execution of a user session.

In the example where higher latency media 170 is a nonvolatile device, if a loss of power occurs (block 350), computing system 110 may be initialized (block 310) and the cache metadata stored in higher latency media 170 may be prefetched from higher latency media 170 (block 310) and stored in lower latency media 160 (block 320).

Depending on the caching algorithm used by computing system 110, the cache metadata may be accessed frequently during operation of computing system 110 to determine, for example, the state of the cache. By caching the cache metadata in lower latency media 160, which may be relatively smaller and faster than higher latency media 170, the system performance may be improved. Another possible performance improvement may be realized by reducing the absolute size and format of the metadata in higher latency media 170 to reduce the fetch time from higher latency media 170.

Memory controller 140 may be used to manage the caching of data in lower latency media 160 and higher latency media 170, although the scope of the present invention is not limited in this respect. For example, memory controller 140 may be used to transfer data from mass storage device 180 to higher latency media 170, and cache this data. Also, memory controller 140 may be used to generate corresponding metadata and store this metadata in higher latency media 170. In addition, memory controller 140 may be used to manage the transfer and storing of cache metadata between lower latency media 160 and higher latency media 170.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method, comprising: storing cache metadata from a first media to a second media, wherein the first media is a nonvolatile polymer memory.

2. The method of claim 1, further comprising storing cache data in the first media, wherein the cache metadata corresponds to the cache data.

3. The method of claim 2, further comprising deallocating a line of the cache data in the first media if the first media is considered full based, at least in part, on the cache metadata.

4. The method of claim 2, wherein storing the cache metadata comprises storing cache metadata that includes usage information for the cache data.

5. The method of claim 4, wherein storing the cache metadata comprises storing cache metadata that includes a hit count and further comprising deallocating a portion of the cache data if the hit count is less than a predetermined count.

6. The method of claim 5, further including updating the hit count when a cache line of the cache data is read.

7. The method of claim 2, wherein storing the cache metadata comprises storing cache metadata that includes a bit indicating whether the cache data is valid.

8. The method of claim 1, wherein the storing occurs during initialization of the second media.

9. The method of claim 1, further comprising prefetching the cache metadata from the first media to the second media.

10. The method of claim 1, further comprising demand fetching the cache metadata from the first media to the second media.

11. The method of claim 1, wherein an access time of the second media is at least two times faster than an access time of second media.

12. A system, comprising:
a first media adapted to store cache data and metadata corresponding to the cache data, wherein the first media is a nonvolatile polymer memory; and
a second media adapted to cache the metadata.

13. The system of claim 12, wherein the first media is a portion of a mass storage device.

14. The system of claim 12, wherein the first media is a disk cache, wherein an access time of the second media is less than an access time of the first media.

15. The system of claim 12, wherein the first media is a nonvolatile ferroelectric memory.

16. The system of claim 12, wherein the first media has an access time of at least 500 nanoseconds.

17. The system of claim 12, wherein the second media has an access time of less than 500 nanoseconds.

18. The system of claim 12, wherein the second media is a volatile memory.

19. An article comprising a storage medium having stored thereon instructions, that, when executed by a computing platform, result in: storing cache metadata from a first media to a second media, wherein the first media is a nonvolatile polymer memory.

20. The article of claim 19, wherein the instructions, when executed, further result in: storing cache data in the first media, wherein the cache metadata corresponds to the cache data.

21. The article of claim 19, wherein the instructions, when executed, further result in: prefetching the cache metadata from the first media to the second media.

22. The article of claim 19, wherein the storing occurs during initialization of the second media.

23. A system, comprising:
a nonvolatile polymer memory adapted to store data and corresponding metadata; and
a dynamic random access memory (DRAM) adapted to cache the metadata.

24. The system of claim 23, further comprising a memory controller adapted to transmit the metadata from the nonvolatile polymer memory to the DRAM during initialization of the system.

25. A method, comprising: transferring cache metadata from a nonvolatile polymer memory of a system to another memory of the system.

26. The method of claim 25, wherein transferring occurs during initialization of the system and wherein the another memory is a volatile memory and wherein an access time of the another memory is less than an access time of nonvolatile polymer memory.

27. The method of claim 25, further comprising storing cache data in the nonvolatile polymer memory, wherein the cache metadata corresponds to the cache data and wherein the nonvolatile polymer memory is a disk cache to cache data for a disk memory.

28. A system, comprising:
a first memory adapted to store cache data and metadata corresponding to the cache data; and
a second memory adapted to cache the metadata, wherein the first memory is a nonvolatile polymer memory.

29. The system of claim 28, wherein an access time of the second memory is less than an access time of the first memory.

30. The system of claim 28, wherein the second memory is a volatile memory.

31. A system, comprising:
a first memory adapted to store cache data and metadata corresponding to the cache data; and
a second memory adapted to cache the metadata, wherein the first memory is an electrically programmable read-only memory (EPROM), an electrically erasable and programmable read only memory (EEPROM), a flash memory, a ferroelectric random access memory (FRAM), or a magnetic random access memory (MRAM).

32. The system of claim 31, wherein an access time of the second memory is less than an access time of the first memory.

33. The system of claim 31, wherein the second memory is a volatile memory.

* * * * *